United States Patent [19]

Light

[11] Patent Number: 4,457,417

[45] Date of Patent: Jul. 3, 1984

[54] TORQUE RESPONSIVE FLUID COUPLING DEVICE

[75] Inventor: Gerard M. Light, Marshall, Mich.

[73] Assignee: Eaton Corporation, Cleveland, Ohio

[21] Appl. No.: 282,978

[22] Filed: Jul. 13, 1981

[51] Int. Cl.³ .............................................. F16D 31/00
[52] U.S. Cl. ................................. 192/58 B; 192/85 F; 192/103 F
[58] Field of Search ................. 192/82 T, 58 B, 85 F, 192/103 F

[56] References Cited

U.S. PATENT DOCUMENTS

| | | | |
|---|---|---|---|
| 3,403,764 | 10/1968 | Sutaruk | 192/58 B |
| 3,575,269 | 4/1971 | Sherman | 192/58 B |
| 3,690,428 | 9/1972 | LaFlame | 192/103 FA |
| 3,840,101 | 10/1974 | Peter et al. | 192/82 T |
| 3,841,451 | 10/1974 | Saylor et al. | 192/58 B |
| 4,056,178 | 11/1977 | Detty | 192/58 B |
| 4,238,016 | 12/1980 | Yoshida et al. | 192/58 B |

Primary Examiner—Cornelius J. Husar
Assistant Examiner—Joseph A. Fischetti
Attorney, Agent, or Firm—C. H. Grace; L. J. Kasper

[57] ABSTRACT

A fluid coupling device is disclosed which is basically of the torque responsive type. The fluid coupling includes a separator plate (31) to separate the fluid chamber into a working or operating chamber (33) and a reservoir chamber (35). The separator plate is provided with a pumping element (47), and disposed adjacent thereto is a fluid orifice (45). When the coupling is operating in the low input speed range, the centrifugal force acting on the fluid in the reservoir generates a greater pressure in the region of the orifice (45) than does the pumping element 47, thus resulting in flow of fluid from the reservoir to the working chamber through the fluid orifice. As the slip speed of a coupling reaches the predetermined value, the pressure generated by the pumping element is greater than that generated by centrifugal force, and fluid flows from the working chamber to the reservoir, thus achieving the disengaged condition of the coupling. If additional fill rate capability is needed, a secondary fill orifice (49) may be added.

6 Claims, 3 Drawing Figures

TORQUE RESPONSIVE FLUID COUPLING DEVICE

BACKGROUND OF THE DISCLOSURE

The present invention relates to fluid coupling devices, and more particularly, to fluid coupling devices of the type normally referred to as "torque responsive".

Although fluid coupling devices of the type to which the present invention relates have many applications, the present invention is especially suited for use with fluid coupling devices for driving the radiator cooling fan of a vehicle engine, and will be described in connection therewith.

Fluid coupling devices of the type to which the present invention relates normally comprise an output coupling member which cooperates with a cover to define a fluid chamber therein. Disposed within the fluid chamber is an input coupling member which cooperates with the adjacent surface of the output coupling member to define a shear space. The shear space is filled with a viscous fluid (typically, a silicone fluid) and torque is transmitted from the input member to the output member by means of viscous fluid shear. Thus, fluid couplings of this type are also referred to as viscous couplings, and when used for driving radiator cooling fans are referred to as viscous fan drives.

PRIOR ART

Early viscous couplings were of the torque responsive type, i.e., they included only a single fluid chamber (a working chamber) and the output speed of the coupling (fan speed) was limited only by the torque transmitting capacity of the coupling. In typical torque responsive couplings, in order to increase the fan speed at engine idle (i.e., low input speed), it was necessary to increase either the shear area or the fluid viscosity or both. This would result in excessive fan speed at higher engine speeds when relatively little cooling of the radiator by the fan is required, because of the incoming ram air. Conversely, the fan speed at high engine speeds could be reduced by reducing the shear area and/or reducing the fluid viscosity. This would result in insufficient fan speed at engine idle, which would result in overheating of the engine.

The prior art attempted to overcome these problems by providing torque responsive viscous couplings with separate working and reservoir fluid chambers and further providing some sort of centrifugally-actuated valve to communicate fluid from the working chamber to the reservoir, at relatively higher engine speeds, thus limiting fan speed. These arrangements tended to be complicated and expensive, and were generally not commercially successful.

Further attempts by the prior art to overcome these problems resulted in the development of temperature-responsive viscous couplings in which a temperature responsive valve permits fluid to flow from the reservoir through a fill orifice to the working chamber when cooling is required. Such couplings also include a pump element to pump fluid from the working chamber through a discharge orifice to the reservoir when cooling is not required. Viscous couplings of the temperature-responsive type have been commercially successful despite being substantially more complicated and more expansive than torque responsive couplings.

SUMMARY OF THE INVENTION

Accordingly, it is an object of the present invention to provide a fluid coupling device which is capable of a relatively high output speed at low input speeds, and a relatively low output speed at higher input speeds.

It is a more specific object of the present invention to provide a torque responsive viscous coupling which accomplishes the above-stated object without the need for complicated and expensive valving, temperature controls, etc.

The above and other objects of the present invention are accomplished by the provision of an improved fluid coupling device of the type including a first rotatable coupling member, cover means associated therewith to define a fluid chamber, and means disposed to separate the fluid chamber into an operating chamber and a reservoir chamber. A second rotatable coupling member is disposed in the operating chamber and is rotatable relative to the first coupling member. The coupling members cooperate to define a shear space operable to transmit torque in response to the presence of fluid therein.

The improvement comprises the separating means defining fluid orifice means operable to permit fluid communication between the operating chamber and the reservoir chamber. Pump means is operatively associated with the separating means or the first coupling member to pump fluid from the operating chamber through the orifice means to the reservoir chamber, to achieve a disengaged condition, when the difference between the rotational speeds of the first and second coupling members exceeds a predetermined value. The fluid orifice means is selected such that below the predetermined value of speed difference, centrifugal force acting on fluid in the reservoir chamber overcomes the pressure generated by the pump means to cause fluid to flow from the reservoir chamber through the orifice means to the operating chamber, to achieve an engaged condition.

DESCRIPTION OF THE PREFERRED EMBODIMENT

Figure 1:
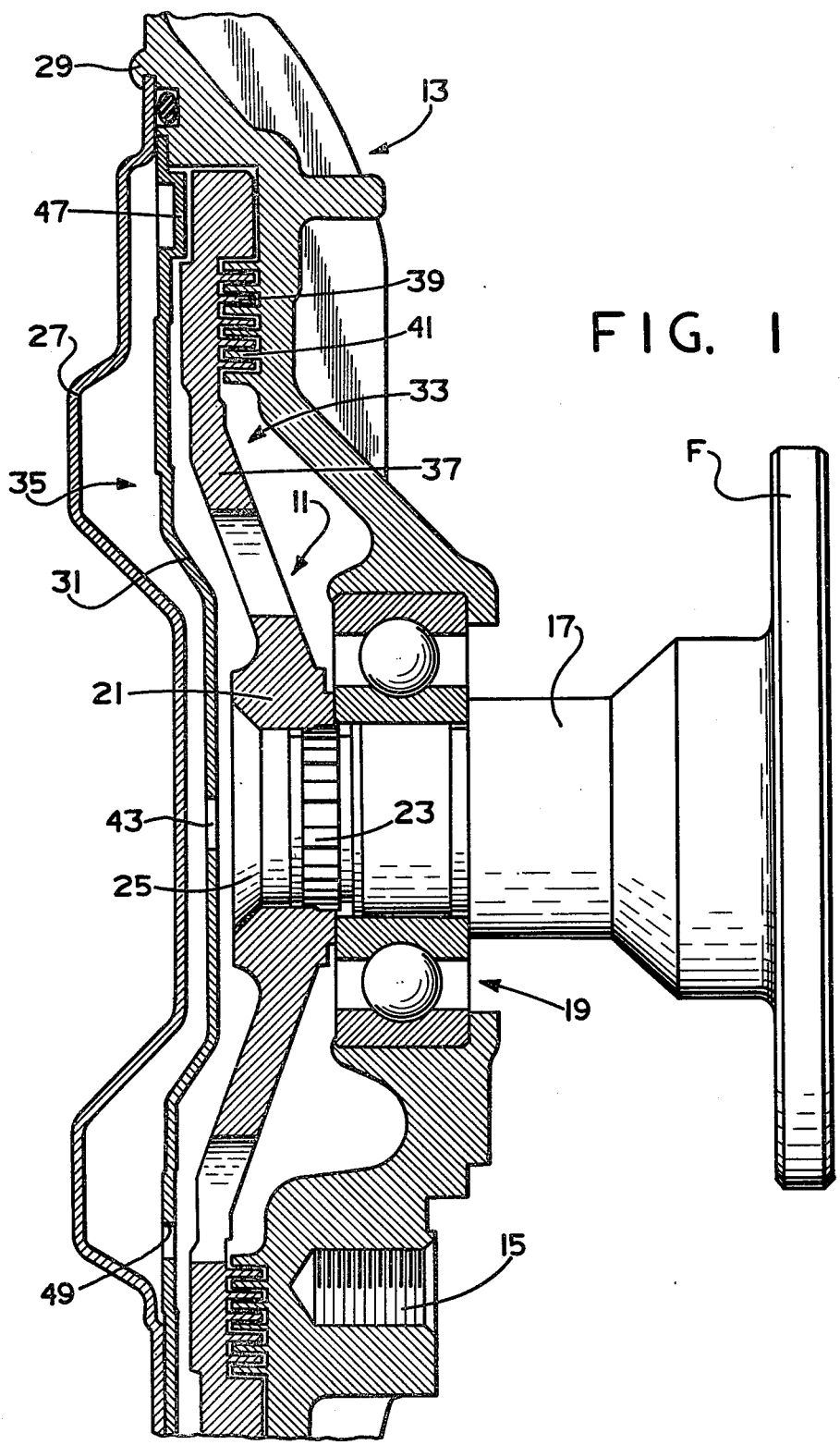
FIG. 1 is an axial cross section of a typical fluid coupling device utilizing the present invention.

Referring now to the drawings, which are not intended to limit the invention, FIG. 1 illustrates one preferred form of a fluid coupling device in which the present invention may be utilized. The coupling device includes an input coupling member 11 and an output coupling member 13. If the viscous coupling of the present invention is used as a drive for a radiator cooling fan, the fan (not shown) may be bolted to the output coupling member 13 by means of a plurality of threaded bores 15. The coupling includes an input shaft 17 on which the input coupling member 11 is mounted, and which is rotatably driven, typically by means of a flange F which may be bolted to the flange of an engine water pump (not shown). The input shaft 17 functions as a support for the inner race of a bearing set 19, which is seated on the inside diameter of the output coupling member 13.

The input coupling member 11 is in the form of an annular disc having a hub portion 21 supported by the forward end of the shaft 17. The hub portion 21 has an opening which has an interference fit with a serrated portion 23 of the shaft 17. The hub portion 21 is pressed onto the serrated portion 23 until it abuts the side of the inner race of the bearing set 19, and the output end (left end in FIG. 1) of the shaft 17 has a retaining portion 25 for positive retention of the input coupling member 11 on the shaft 17.

The output coupling member 13 has a cover member 27 fixedly attached thereto, as by means of a rolled over portion 29 of the coupling member 13. The coupling member 13 and the cover 27 define a fluid chamber therebetween, and a separator plate 31 separates the fluid chamber into a fluid or working operating chamber 33 and a fluid reservoir chamber 35. The operating chamber 33 comprises the entire volume between the output coupling member 13 and the separator plate 31.

The input coupling member 11 includes an annular, disc-like portion 37, which is preferably integral with the hub portion 21. The disc portion 37 includes, on its rearward face, a plurality of concentric, annular lands 39, while the output coupling member 13 defines a mating plurality of concentric, annular lands 41. The space between these interdigitated lands 39 and 41, as well as the space between the coupling members 11 and 13 lying radially outward from the lands 39 and 41, comprises the shear space, whereby torque is transmitted from the member 11 to the member 13 when viscous fluid is present in the shear space. This aspect of the viscous coupling of the present invention, as well as its general operation, is well known in the art and will not be described in further detail herein.

Figure 2:
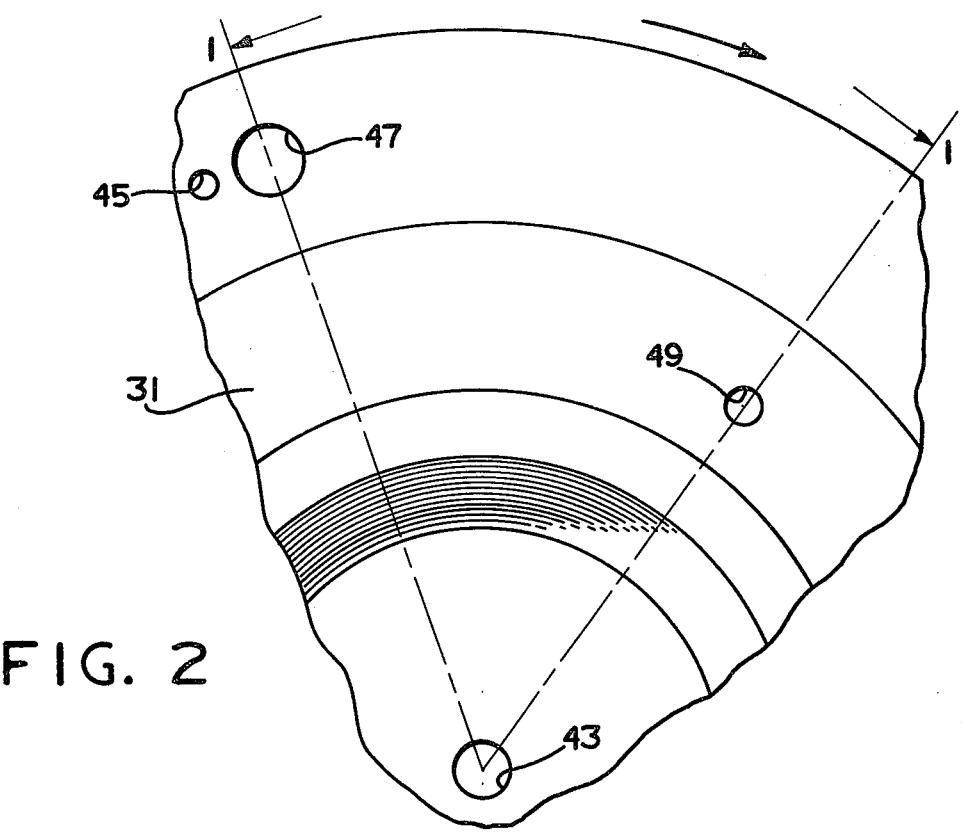
FIG. 2 is a fragmentary plan view, as viewed from the left in FIG. 1, of the separator plate of the invention.

Referring now to FIG. 2, in conjunction with FIG. 1, the separator plate 31 will be described in greater detail. The separator plate 31 includes a central locator hole 43 which is used in the manufacturing process and forms no part of the present invention, but is shown and referenced herein only to facilitate viewing FIGS. 1 and 2 together. Disposed near the outer periphery of the separator plate 31, and shown only in FIG. 2, is a fluid orifice 45, the function of which is to permit fluid communication between the operating chamber 33 and reservoir chamber 35. It is one aspect of the present invention that flow through the orifice 45 may be in either direction, as will be described in greater detail subsequently. Disposed adjacent the fluid orifice 45 is a pumping element 47 which, in the subject embodiment, consists of a recess or a depression in the metal stamping. As is generally well known in the art, when the coupling members 11 and 13 are rotating in the direction shown by the arrow in FIG. 2, a buildup of fluid pressure occurs on the frontal side (left side in FIG. 2) of the pumping element 47. This pressure buildup, on the working chamber side of the separator plate 31, results in a flow of fluid from the working chamber 33 to the reservoir 35, through the fluid orifice 45. In this case, the orifice 45 is serving as a discharge orifice.

As is well known to those skilled in the art, the ability of the pumping element 47 to build up sufficient pressure to cause discharge flow as described above is a function of the "slip" speed of the coupling, i.e., the difference between the rotational speed of the input member 11 and the rotational speed of the output member 13. As the slip speed increases, the rotational speed of fluid impacting the frontal edge of the pumping element 47 increases, thus increasing the pressure buildup described above. Below a predetermined value of slip speed, the pressure buildup caused by the pumping element 47 is relatively low. In this range of relatively low slip speeds, corresponding to lower input speeds, the centrifugal force acting on fluid in the reservoir chamber 35 builds up sufficient pressure in the reservoir 35, in the region of the fluid orifice 45, to overcome the fluid pressure generated by the pumping element 47. When the fluid pressure is greater in the reservoir 35, the flow through the fluid orifice 45 will be from the reservoir 35 to the working chamber 33. In this condition, the fluid orifice 45 serves as a fill orifice. It should be noted that in temperature responsive viscous couplings of the type having pumping elements, flow through the discharge orifice from the reservoir to the working chamber has been known to occur. Such flow is normally referred to as "bleedback" and has always been considered undesirable in couplings of that type.

The separator plate 31 may also include a secondary fill orifice 49 (shown in both FIGS. 1 and 2). The secondary fill orifice 49 would be included if insufficient filling occurs through the fluid orifice 45. The process for determining the need for the secondary fill orifice 49, as well as its size and location, will be described in greater detail subsequently.

In general, it has been found that the necessity for the secondary fill orifice 49 is related to the torque of the fan being driven by the viscous coupling. The "torque of the fan" refers to the torque required to turn a particular fan at a given speed. If the viscous coupling is being used to drive a relatively low torque fan, sufficient filling may be obtained through the fluid orifice 45, and there may be no need for the secondary fill orifice 49. If the viscous coupling is used with a medium torque fan, a small secondary fill orifice 49 may be required. If the coupling is used with a relatively high torque fan, the secondary fill orifice 49 may have to be somewhat larger.

Another important aspect of the present invention relates to the viscosity of the fluid used in the viscous coupling. As is generally well known, a less viscous fluid flows through an orifice more easily, while lower pressures are generated by the pumping element 47 in less viscous fluid. In conventional torque responsive couplings, because there was no reservoir chamber, but only a working chamber, the viscosity of the fluid was normally selected as a "compromise", i.e., to obtain reasonably good output speeds at low input speeds without having excessive output speed at high input speeds. However, the use of the present invention, including the pump-out capability at higher speeds, makes it possible to use a relatively higher viscosity fluid to obtain good low speed characteristics, but higher input speeds do not result in excessive output speeds (and noise and horsepower consumption), because most of the fluid is pumped out of the working chamber. The result is that the only portion of the shear space containing fluid is the space between the outside diameter of the disc portion 37 and the adjacent inside diameter of the output member 13. This is referred to as the "OD drive" condition or the "disengaged" condition.

In order to enable one skilled in the art to practice the present invention, there will now be provided a brief description of the process for empirically determining various factors such as fluid viscosity and the number and size of orifices required.

1. Determine the viscosity of fluid necessary to obtain the desired output speed at a selected, low input speed (e.g., corresponding to engine idle). This should be done with a known quantity of fluid in the working chamber 33, corresponding in amount to the "engaged" condition.

2. Determine the size and configuration of the pumping element 47 and the fluid orifice 45 necessary to obtain a sufficiently low output speed at a relatively high input speed (e.g., corresponding to vehicle crusing speed of 55 mph).

3. Determine whether or not the size of the fluid orifice 45, as determined in step 2 above, provides sufficient filling of the working chamber at low engine speeds.

4. If the fluid orifice 45 does not provide sufficient filling to achieve the engaged condition, within an acceptable period of time (e.g., 30 seconds), add the secondary fill orifice 49. In order to increase the filling rate of the working chamber, the size of the secondary fill orifice 49 may be increased, or it may be located further outward radially than is shown in FIG. 2.

Figure 3:
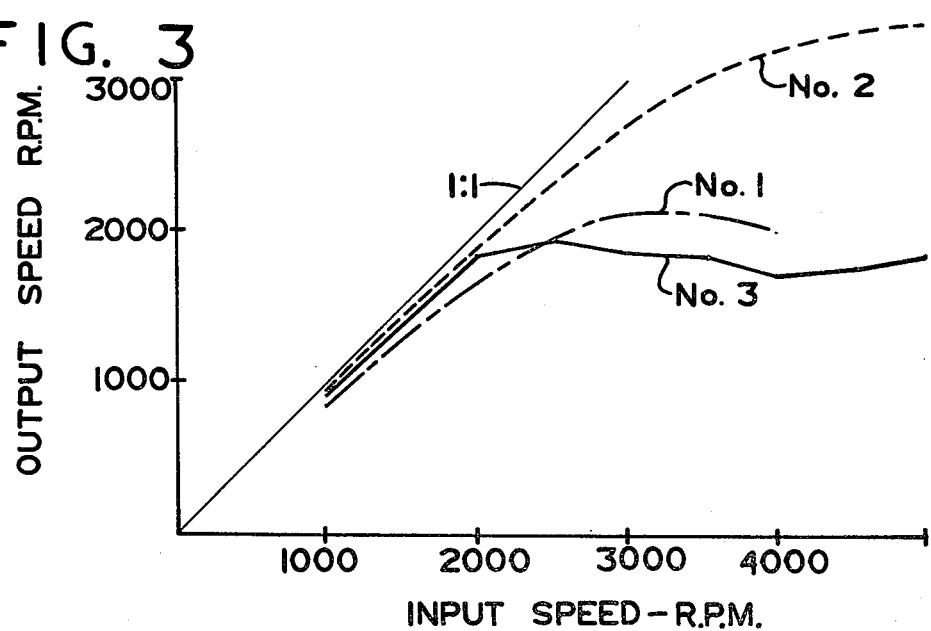
FIG. 3 is a graph of output speed vs. input speed, comparing the present invention with prior art torque responsive couplings.

Referring now to FIG. 3, there will be presented a working example of the present invention, comparing its performance to that of a standard torque responsive viscous coupling, such as that sold by Eaton Corporation under the trademark Torqatrol$^R$ viscous coupling. FIG. 3 is a graph of output speed, as a function of input speed, and covers a range of about 1000 rpm (engine idle) to about 5000 rpm. The curve labeled "No. 1" is a torque responsive coupling filled with fluid having a viscosity of 2000 cs. The curve labeled No. 2 is the same unit filled with fluid having a viscosity of 7000 cs. As would be expected, the coupling containing the 7000 cs fluid has a substantially higher output speed at the lower input speeds, and has a much higher output speed at higher input speeds. The curve labeled No. 3 is a unit made in accordance with the present invention, filled with fluid having a viscosity of 9000 cs. It may be seen in FIG. 3 that the use of the present invention results in a relatively high output speed in the low input speed range, while providing an output speed even below that of the coupling using 2000 cs fluid in the high input speed range. Furthermore, this is accomplished without the use of any complicated or expensive valving, temperature controls, or any other form of controls except for the pumping element 47, the fluid orifice 45, and if necessary, the secondary fill orifice 49.

It will be apparent to those skilled in the art upon a reading and understanding of the present specification that various alterations and modifications may be made in the preferred embodiment, and it is intended to include all such alterations and modifications as part of the invention, insofar as they come within the scope of the appended claims.

What is claimed is:

1. In a fluid coupling device of the type including a first rotatable coupling member defining an axis of rotation, cover means associated with the first coupling member to define a fluid chamber therebetween, means disposed to separate the fluid chamber into a fluid operating chamber and a fluid reservoir chamber, a second rotatable coupling member disposed in the fluid operating chamber and being rotatable relative to the first coupling member, the first and second coupling members cooperating to define a shear space therebetween and operable to transmit torque in response to the presence of fluid therein, the improvement comprising:

(a) the separating means defining a fluid orifice operable to permit reversible fluid communication in either direction between the fluid operating chamber and the fluid reservoir chamber;

(b) pump means operatively associated with one of the separating means and the first rotatable coupling member to pump fluid from the operating chamber through said fluid orifice to the reservoir chamber, to achieve a disengaged condition, in response to the difference between the rotational speeds of the first and second coupling members exceeding a predetermined value whereby the pressure generated by said pump means is greater than the centrifugal force acting on fluid in the reservoir;

(c) said fluid orifice being selected such that, when the speed difference goes below said predetermined value, centrifugal force acting on fluid in the reservoir chamber overcomes the pressure generated by said pump means to cause fluid to flow from the reservoir chamber through said fluid orifice to the operating chamber, to reverse direction of flow through said fluid orifice and achieve an engaged condition.

2. The improvement as claimed in claim 1 wherein said fluid orifice consists essentially of an opening operatively associated with said pump means, substantially all fluid communicated between the operating chamber and the reservoir chamber flowing through said opening.

3. The improvement as claimed in claim 1 wherein the separating means comprises an annular, plate-like member fixed relative to the first rotatable coupling member.

4. A fluid coupling device consisting essentially of:

(a) a first rotatable coupling member;

(b) a cover member associated with said first coupling member to define a fluid chamber therebetween;

(c) a separator plate disposed to separate said fluid chamber into a fluid operating chamber and a fluid reservoir chamber;

(d) a second rotatable coupling member disposed in said operating chamber and being rotatable relative to said first coupling member, said first and second coupling members cooperating to define a shear space therebetween and operable to transmit torque in response to the presence of fluid therein;

(e) said separator plate defining a first fluid orifice disposed to permit fluid communication between said reservoir chamber and said operating chamber, and a second fluid orifice disposed to permit fluid communication from said reservoir chamber to said operating chamber;

(f) a pumping element operatively associated with one of said separator plate and said first rotatable coupling member to pump fluid from said operating chamber through said first fluid orifice to said reservoir chamber to achieve a disengaged condition, when the difference between the rotational speeds of said first and second members exceeds a predetermined value;

(g) said first and second fluid orifices being sized and located such that, below said predetermined value of speed difference, centrifugal force acting on fluid in said reservoir chamber overcomes the pressure generated by said pumping element to cause fluid to flow from said reservoir chamber through said first and second fluid orifices to said operating chamber, to achieve an engaged condition.

5. In a fluid coupling device of the type including no temperature-responsive valve means and including a first rotatable coupling member defining an axis of rotation, cover means associated with the first coupling member to define a fluid chamber therebetween, means disposed to separate the fluid chamber into a fluid operating chamber and a fluid reservoir chamber, a second rotatable coupling member disposed in the fluid operating chamber and being rotatable relative to the first coupling member, the first and second coupling members cooperating to define a shear space therebetween and operable to transmit torque in response to the presence of fluid therein, the improvement comprising:

(a) the separating means defining a fluid orifice operable to permit reversible fluid communication in either direction between the fluid operating chamber and the fluid reservoir chamber;

(b) pump means operatively associated with one of the separating means and the first rotatable coupling member to pump fluid from the operating chamber through said fluid orifice to the reservoir chamber, to achieve a disengaged condition, in response to the difference between the rotational speeds of the first and second coupling members exceeding a predetermined value;

(c) said fluid orifice being selected such that, when the speed difference drops below said predetermined value, centrifugal force acting on fluid in the reservoir chamber overcomes the pressure generated by said pump means to cause fluid to reverse direction of flow through said fluid orifice and flow from the reservoir chamber through said fluid orifice to the operating chamber, to achieve an engaged condition.

6. The improvement as claimed in claim 5 wherein said fluid orifice consists essentially of an opening operatively associated with said pump means, substantially all fluid communicated between the operating chamber and the reservoir chamber flowing through said opening.

* * * * *